United States Patent
Pohl et al.

(10) Patent No.: US 9,120,508 B2
(45) Date of Patent: Sep. 1, 2015

(54) CROSS MEMBER OF A MOTOR VEHICLE BODY

(71) Applicant: GM GLOBAL TECHNOLOGY OPERATIONS LLC, Detroit, MI (US)

(72) Inventors: Thorsten Pohl, Mainz (DE); Juergen Dick, Ruesselsheim (DE); Andreas Kirsch, Geisenheim (DE); Wolfram Lieven, Kleinostheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 13/670,895

(22) Filed: Nov. 7, 2012

(65) Prior Publication Data

US 2013/0118823 A1 May 16, 2013

(51) Int. Cl.
  *B62D 25/20* (2006.01)
  *B60K 1/04* (2006.01)
  *B62D 25/08* (2006.01)

(52) U.S. Cl.
  CPC . *B62D 25/20* (2013.01); *B60K 1/04* (2013.01); *B62D 25/087* (2013.01); *B62D 25/2027* (2013.01); *B60K 2001/0416* (2013.01); *B60K 2001/0438* (2013.01)

(58) Field of Classification Search
  USPC ................................. 180/68.5, 312
  See application file for complete search history.

(56) References Cited

U.S. PATENT DOCUMENTS

| | | | | |
|---|---|---|---|---|
| 1,528,517 A | | 3/1925 | Mearl | |
| 4,058,182 A | * | 11/1977 | Huber | 180/274 |
| 4,339,015 A | * | 7/1982 | Fowkes et al. | 180/65.1 |
| 4,365,681 A | * | 12/1982 | Singh | 180/68.5 |
| 5,390,754 A | * | 2/1995 | Masuyama et al. | 180/68.5 |
| 5,392,873 A | * | 2/1995 | Masuyama et al. | 180/68.5 |
| 5,501,289 A | * | 3/1996 | Nishikawa et al. | 180/68.5 |
| 5,918,692 A | * | 7/1999 | Sekita et al. | 180/56 |
| 6,085,854 A | * | 7/2000 | Nishikawa | 180/68.5 |
| 6,188,574 B1 | * | 2/2001 | Anazawa | 361/695 |
| 6,220,380 B1 | * | 4/2001 | Mita et al. | 180/65.1 |
| 6,227,322 B1 | * | 5/2001 | Nishikawa | 180/68.5 |
| 6,315,069 B1 | * | 11/2001 | Suba et al. | 180/68.5 |
| 6,648,085 B2 | * | 11/2003 | Nagura et al. | 180/65.1 |
| 6,736,229 B1 | | 5/2004 | Amori et al. | |
| 6,978,855 B2 | * | 12/2005 | Kubota et al. | 429/442 |
| 7,610,978 B2 | * | 11/2009 | Takasaki et al. | 180/68.5 |
| 7,654,351 B2 | * | 2/2010 | Koike et al. | 180/68.5 |

(Continued)

FOREIGN PATENT DOCUMENTS

| | | |
|---|---|---|
| DE | 3101160 A1 | 8/1982 |
| DE | 19520870 A1 | 12/1996 |

(Continued)

OTHER PUBLICATIONS

German Patent Office, German Search Report for Application No. 102011118181.8, dated Jun. 21, 2012.

*Primary Examiner* — Jeffrey J Restifo

(74) *Attorney, Agent, or Firm* — Ingrassia Fisher & Lorenz PC

(57) ABSTRACT

A cross member of a motor vehicle body is provided. The cross member is designed for forming a load-transmitting connection between two side members of the body and can be structurally connected to these. The cross member includes at least one floor portion that is depressed relative to a marginal rim, which together with at least one side wall adjoining thereon forms at least one stowage space for receiving items.

12 Claims, 2 Drawing Sheets

(56) References Cited

U.S. PATENT DOCUMENTS

| | | | |
|---|---|---|---|
| 7,654,352 B2* | 2/2010 | Takasaki et al. | 180/68.5 |
| 7,688,582 B2* | 3/2010 | Fukazu et al. | 361/690 |
| 7,997,368 B2* | 8/2011 | Takasaki et al. | 180/68.5 |
| 8,072,682 B2 | 12/2011 | Kitano et al. | |
| 8,079,435 B2* | 12/2011 | Takasaki et al. | 180/68.5 |
| 8,210,301 B2* | 7/2012 | Hashimoto et al. | 180/68.5 |
| 8,556,016 B2* | 10/2013 | Yoda et al. | 180/68.5 |
| 8,556,017 B2* | 10/2013 | Kubota et al. | 180/68.5 |
| 8,561,743 B2* | 10/2013 | Iwasa et al. | 180/68.5 |
| 8,567,543 B2* | 10/2013 | Kubota et al. | 180/68.5 |
| 2008/0062622 A1* | 3/2008 | Fukazu et al. | 361/678 |
| 2008/0237283 A1 | 10/2008 | Ichikawa | |
| 2009/0242299 A1* | 10/2009 | Takasaki et al. | 180/68.5 |
| 2009/0315363 A1 | 12/2009 | Ganti et al. | |
| 2010/0307848 A1* | 12/2010 | Hashimoto et al. | 180/68.5 |
| 2011/0000729 A1* | 1/2011 | Schwarz et al. | 180/68.5 |
| 2011/0297469 A1* | 12/2011 | Usami et al. | 180/68.5 |
| 2011/0315464 A1 | 12/2011 | Yokoyama et al. | |
| 2012/0018238 A1* | 1/2012 | Mizoguchi et al. | 180/68.5 |
| 2012/0043147 A1* | 2/2012 | Milner et al. | 180/68.5 |
| 2012/0055725 A1* | 3/2012 | Mizoguchi et al. | 180/68.5 |
| 2013/0068548 A1* | 3/2013 | Akazawa et al. | 180/68.5 |
| 2013/0118823 A1* | 5/2013 | Pohl et al. | 180/68.5 |
| 2013/0126254 A1* | 5/2013 | Lee et al. | 180/68.5 |

FOREIGN PATENT DOCUMENTS

| | | |
|---|---|---|
| DE | 19703654 A1 | 8/1998 |
| DE | 10044740 A1 | 3/2002 |
| DE | 102005052307 A1 | 5/2007 |
| DE | 102007041382 A1 | 3/2009 |
| DE | 102008051565 A1 | 4/2010 |
| DE | 102009057741 A1 | 7/2010 |
| GB | 2486521 A | 6/2012 |
| JP | 2011126485 A | 6/2011 |

* cited by examiner

CROSS MEMBER OF A MOTOR VEHICLE BODY

CROSS-REFERENCE TO RELATED APPLICATION

This application claims priority to German Patent Application No. 10 2011 118 181.8, filed Nov. 10, 2011, which is incorporated herein by reference in its entirety.

TECHNICAL FIELD

This application pertains to a cross member of a motor vehicle body and a motor vehicle body equipped with such.

BACKGROUND

Motor vehicle bodies, in particular self-supporting bodies provide load-bearing and load-transmitting structures in order to distribute on the one hand the weight force of the motor vehicle as evenly as possible over the vehicle wheels and on the other hand bear and discharge possible forces externally acting on the motor vehicle in a controlled manner.

Motor vehicle bodies should generally be designed torsionally rigid, stable and mechanically loadable and also have as low as possible a dead weight. Self-supporting motor vehicle bodies typically comprise two side member structures spaced from each other in vehicle transverse direction (y) and each substantially extending in vehicle longitudinal direction (x), which are typically interconnected via a plurality of cross members substantially extending in vehicle transverse direction (y). The cross members in this case serve for a structural and load path-transmitting coupling of the side members substantially running parallel to each other.

By means of one or a plurality of cross members, possible transverse forces that occur for example in the event of a lateral impact are to be absorbed in a defined manner and/or discharged in a controlled manner into regions of the motor vehicle body located opposite and facing away from the impact. In this regard, popular cross members are designed as a hollow profile closed in cross section, which extends between side members spaced from each other in vehicle transverse direction (y).

Such hollow profiles of cross members of a motor vehicle body however are disadvantageous with respect to an efficient utilisation of the space that is available in motor vehicle. A closed hollow profile takes up comparatively matched space and reduces the stowage space that is generally available in the motor vehicle.

Accordingly, it may be desirable to provide a cross member that is improved with respect to the space division of a motor vehicle, which takes up a comparatively small dimension of space.

In addition, other objects, desirable features and characteristics will become apparent from the subsequent summary and detailed description, and the appended claims, taken in conjunction with the accompanying drawings and this background.

SUMMARY

Insofar, a cross member of a motor vehicle body is provided, which for forming a load-transmitting connection between two side members of the body generally lying spaced from each other in vehicle transverse direction (y). The cross member in this case can be connected to the side members located opposite in a structural, i.e. load-transmitting manner so that by means of the cross member possible corresponding transverse forces in the event of a lateral impact or a corresponding lateral intrusion into the body or upon a bending-through or twisting of the body can be discharged to a side member located opposite or onto other structures.

The cross member furthermore comprises at least one floor portion that is depressed relative to a lateral margin, which floor portion together with at least one side wall of the cross member adjoining thereon forms at least one stowage space for receiving objects. The cross member generally comprises a circulating marginal rim or a plurality of marginal rims which via suitable side walls merge into a floor portion which with respect to the vehicle vertical direction (z) is located impressed thereto. Marginal rims, side walls and floor portion in this case can be largely formed unitarily, wherein the cross member is generally formed as a formed sheet metal part. It is furthermore conceivable that the cross member has a multi-part construction, wherein the side wall or wherein a plurality of side walls is/are separately connected to the floor portion and if applicable to the lateral margins adjoining the side wall.

In that the cross member has a depressed floor portion with respect to its marginal rims generally formed as connecting flange it is formed accessible from the top and because of its trough-shaped contour offers additional stowage space for receiving items, in one example, motor vehicle components such as for example motor vehicle battery and/or fuel tank.

According to one exemplary embodiment, it is provided that the cross member has a trough-like shaping and is designed for receiving at least one motor vehicle component. The trough-like depression of the cross member can be designed in one example, for receiving motor vehicle batteries and for receiving accumulators or battery modules for a possible electric drive of an electric vehicle or hybrid vehicle. Furthermore, the cross member can comprise in one example, in the region of its floor portion or inside on at least one side wall, fastening structures for fixing the vehicle components to be received on or in the cross member.

Further provided according to one of various exemplary embodiments is that the cross member can be connected with at least one marginal rim to a lower side or inside of side members of the motor vehicle body located opposite. Thus, the cross member can for example be fastened to the lower side of the adjoining side member, generally welded or screwed thereto. According to another exemplary embodiment, it can also be provided that at least one side wall delimiting the stowage space in one example, a face wall substantially delimiting the longitudinal extension of the cross member can be structurally connected to at least one side member. The face wall of the cross member in this case can for example directly adjoin a side wall of the cross member directed to the inside and be connected to the latter.

According to another exemplary embodiment, a body of a motor vehicle is additionally provided with two side members which are substantially spaced from each other in vehicle transverse direction (y) and in each case substantially in vehicle longitudinal direction (x), which by means of a cross member described before, are interconnected structurally and in a load-transmitting manner. In that the cross member has a trough-like depression, it can serve for maximising utilisable space that is effectively available in the motor vehicle without substantially increasing the gross weight of the motor vehicle. The cross member in this case is approximately U-profile-like in cross section and substantially open towards the top, seen in vehicle vertical direction (z), i.e. designed accessible from above, in order to arrange and fasten the components to be carried along in the motor vehicle such as for example batteries on or in the cross member. Together with the marginal rim or the marginal rims the cross member can also have a top hat-like profile in cross section.

According to another exemplary embodiment, it can be provided here in one example, that the stowage space provided by the cross member extends approximately at the height of the side member. This means based on the vehicle vertical direction (z), the at least one cross member extends in the same plane in which the adjoining side members also run. In that the cross member is formed and arranged largely offset-free to the adjoining side members, possible transverse forces introduced into the side members can be absorbed comparatively well and for example be discharged into a cross member in each case located opposite.

According to another exemplary embodiment, it is provided furthermore that the marginal rims, for example as marginal connecting flanges of the cross member come to lie substantially flush with the surface of at least one floor panel extending in vehicle longitudinal direction (x). Insofar, the cross member, viewed from above, can provide a trough-like depression between two floor panels adjoining the cross member approximately in vehicle longitudinal direction (x). The two floor panels arranged on opposite sides of the cross member can lie in a common plane.

Here it can be provided in one example, that the cross member extends in vehicle longitudinal direction (x) between a rear-end floor panel and a floor panel for example formed as heel plate. Based on the overall vehicle geometry, the present cross member is generally designed as rear cross member, which comes to lie approximately in the region of rear wheel housings or spring strut mountings of the body.

According to another exemplary embodiment, it can be provided furthermore that the side walls or faces of the cross member located in one example, in vehicle transverse direction (y) are structurally connected to side walls located inside of the respective adjoining side member. The corresponding side walls or faces of the cross member in this case can be welded in one example to the sides located inside of the adjoining side members or screwed to these. Here it is provided in one example, that the cross member also comprises at least one, generally a plurality of fastening flanges formed circulating about the cross-sectional profile of the cross member adjoining the face-end side walls, which on reaching an end installation position are generally structurally connected, generally welded to the respective adjoining side wall located inside of the side members over the full area.

Finally, according to another one of various aspects, a motor vehicle, in one example, a passenger car is provided, which comprises a body described before or at least a cross member described before.

It is noted furthermore at this point that all features mentioned with respect to the cross member equally apply to the body as well as to the motor vehicle and vice versa.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
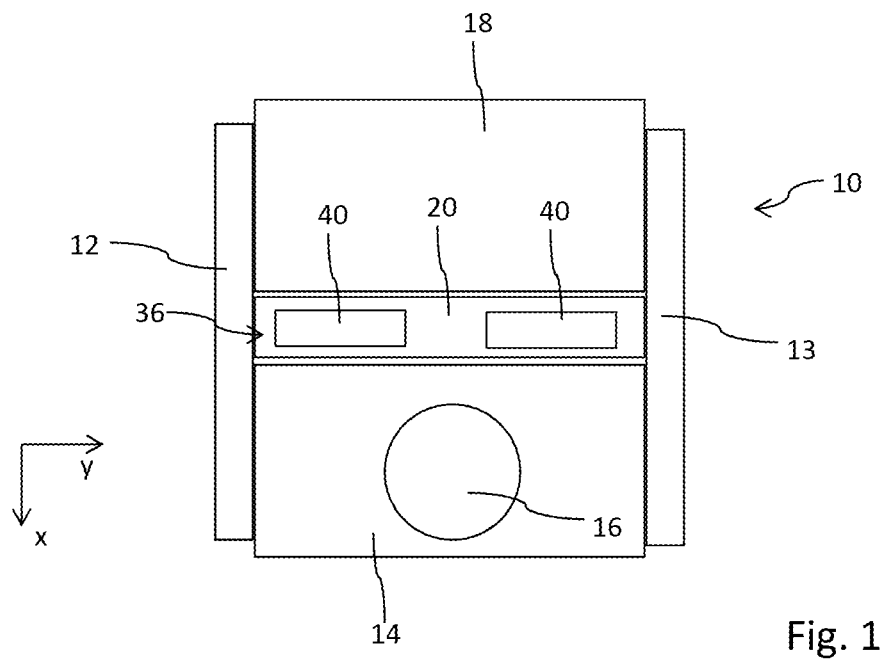
FIG. 1 is a schematic representation of a rear-end detail of a motor vehicle body.
Figure 2:
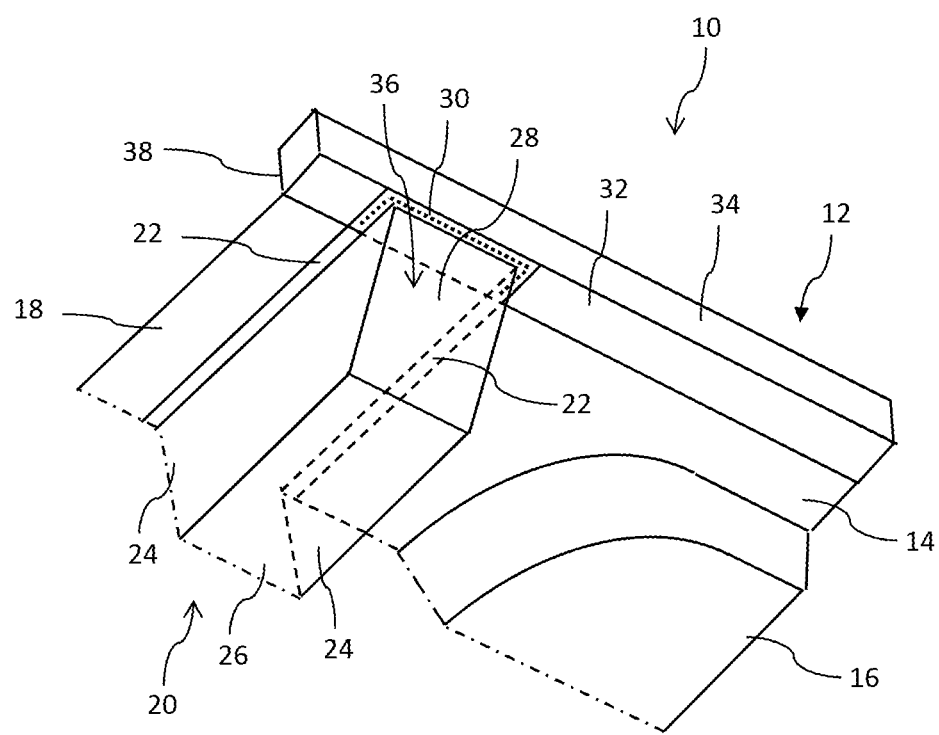
FIG. 2 is a perspective representation of the rear-end body structure viewed from obliquely below.

The motor vehicle 10 that is merely shown in detail in the FIGS. 1 and 2 comprises two side members 12, 13 substantially extending in vehicle longitudinal direction (x) and spaced from each other in vehicle transverse direction (y), which are connected to each other by means of a cross member 20 in a structural manner, i.e. in a load-transmitting as well as load path-transmitting manner. In addition, two floor panels 14, 18 which in vehicle longitudinal direction (x) adjoin the cross members 20 extend between the side members 12, 13. The cross member 20 has a trough-like contour and geometry with front and rear side walls 24 as well as with a face-end side wall 28, which towards the top, seen in vehicle vertical direction (z) merge into a circumferential marginal section 22, 30, 22 which is designed as fastening flange.

On the other end, i.e. downwards, the side walls 24, 22 are connected to a floor portion 26 which, viewed in vehicle vertical direction (z), is designed as a depression relative to the circumferential margin 22, 30, 22 and accordingly is designed as stowage space 36 for receiving motor vehicle components or items 40 to be carried along in the motor vehicle, for example one or a plurality of battery modules. As is shown in FIG. 2, the cross member 20 with its circumferential marginal sections 22, 30, 22 adjoins a lower side 32 of the side member 12. Here, the marginal sections 22 located in vehicle longitudinal direction (x), which are designed as connecting flange, come to lie in an approximately surface-flush manner to the adjoining floor panels 14, 18. Alternatively to the configuration shown in FIG. 2 it is conceivable furthermore that side walls 28 of the cross member 20 on the face end, i.e. located in vehicle transverse direction (y) directly adjoin side walls 38 in each case located inside of the cross members 12, 13 located opposite each other where they are structurally connected to these. Here it is conceivable in one example, that the face-end side wall 28 is also provided with fastening flange portions corresponding to the respective shaping of adjoining side members 12, 13 in order to provide a generally torsionally-rigid structural coupling of side members 12, 13 and the at least one cross member 20.

Furthermore it is shown in FIG. 2 that the approximately rear-end floor panel 14 located at the back in travelling direction (x) has a further depression in the form of a spare wheel trough 16. Said trough can come to lie in a plane approximately corresponding to the cross member based on the vehicle vertical direction (z).

Figure 3:
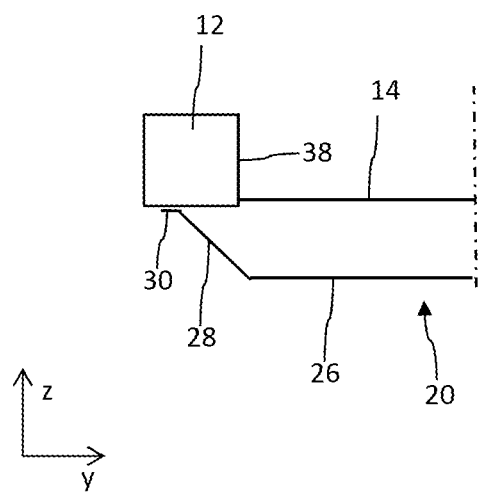
FIG. 3 is a cross section of a cross member connection according to FIG. 2 in the y-z-plane.

FIG. 3 finally shows a cross section through the cross member shown in FIG. 2 in a y-z plane formed by vehicle vertical axis (z) and vehicle transverse axis (y). The cross member 20 in this case comes to lie on a lower side 32 of a side member 12 where it is welded to the side member 12 in the region of a marginal flange portion 30.

Figure 4:
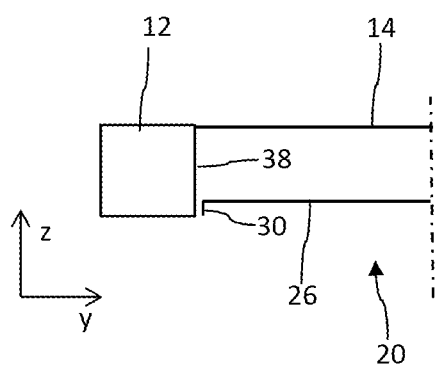
FIG. 4 is a comparable cross section through a cross member adjoining an inside of a side member.

FIG. 4 shows a configuration deviating from this, wherein the cross member 20 comes to lie being braced on an inner side wall 38 of the side member 12 where it is connected, generally welded to the inside of the side member by means of a welding flange 30.

According to the respective position of the cross member 20 in vehicle vertical direction (z), a floor panel 14 located above or offset in vehicle vertical direction (z) to the floor portion 26 of the cross member 20 can be arranged at a different height (z) on the side members 12, 13 located opposite. In the configuration according to FIG. 4, the height of the mounting provided by the cross member 20 is predetermined through the construction height of the side member 12.

In the configuration of FIG. 3 by contrast, a floor panel 14 adjoining the cross member 20 can also be arranged adjoining a lower margin of a side member 12 and thus be arranged located far deeper in the vehicle compared to a configuration according to FIG. 4.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A cross member of a motor vehicle body which is designed for forming a load-transmitting connection between two side members of the body and is structurally connected to the two side members, the cross member comprising:
   at least one floor portion that is depressed relative to a lateral margin, which together with at least one side wall adjoining thereon forms at least one stowage space for receiving items, and
   wherein the at least one side wall delimiting the stowage space of the cross member is structurally and directly connected to the one of the side members, and
   wherein the at least one stowage space of the cross member extends in a plane formed by the two side members.

2. The cross member according to claim 1, which comprises a trough-like shaping and receives at least one item designed as motor vehicle component.

3. The cross member according to claim 2, wherein the motor vehicle component is a battery.

4. The cross member according to claim 1, which is connected with the lateral margin to a lower side or an inside of the side member.

5. A body of a motor vehicle, comprising:
   at least two side members spaced from each other in vehicle transverse direction and each substantially extending in vehicle longitudinal direction; and
   a cross member that interconnects the at least two side members in at least one of a structural and load-transmitting manner, the cross member including:
   at least one floor portion that is depressed relative to at least one lateral margin, which together with at least one side wall adjoining thereon forms at least one stowage space for receiving items, and
   wherein the at least one side wall delimiting the stowage space of the cross member is structurally and directly connected to the at least two side members, and
   wherein the stowage space of the cross member extends in the plane formed by the at least two side members.

6. The motor vehicle body according to claim 5, wherein the at least one lateral margin of the cross member come to lie substantially flush with the surface of the at least one floor panel adjoining the at least two side members in vehicle longitudinal direction.

7. The motor vehicle body according to claim 5, wherein the cross member viewed in vehicle longitudinal direction extends between a rear-end floor panel and a floor panel designed as heel plate.

8. The motor vehicle body according to claim 5, wherein at least one side wall of the cross member located in vehicle transverse direction is connected in a structural and load-transmitting manner to at least one side wall located inside one of the at least two side members.

9. A motor vehicle, comprising:
   a motor vehicle body including at least two side members spaced from each other in vehicle transverse direction and each substantially extending in vehicle longitudinal direction; and
   a cross member that interconnects the at least two side members in at least one of a structural and load-transmitting manner, the cross member including:
   at least one floor portion that is depressed relative to at least one lateral margin, which together with at least one side wall adjoining thereon forms at least one stowage space for receiving items,
   wherein the stowage space of the cross member extends in the plane formed by the at least two side members, and
   wherein the at least one side wall delimiting the stowage space of the cross member is structurally and directly connected to the at least two side members.

10. The motor vehicle according to claim 9, wherein the at least one lateral margin of the cross member come to lie substantially flush with the surface of at least one floor panel adjoining the at least two side members in vehicle longitudinal direction.

11. The motor vehicle according to claim 9, wherein the cross member viewed in vehicle longitudinal direction extends between a rear-end floor panel and a floor panel designed as heel plate.

12. The motor vehicle according to claim 9, wherein at least one side wall of the cross member located in vehicle transverse direction is connected in a structural and load-transmitting manner to at least one side wall located inside one of the at least two side members.

\* \* \* \* \*